United States Patent Office

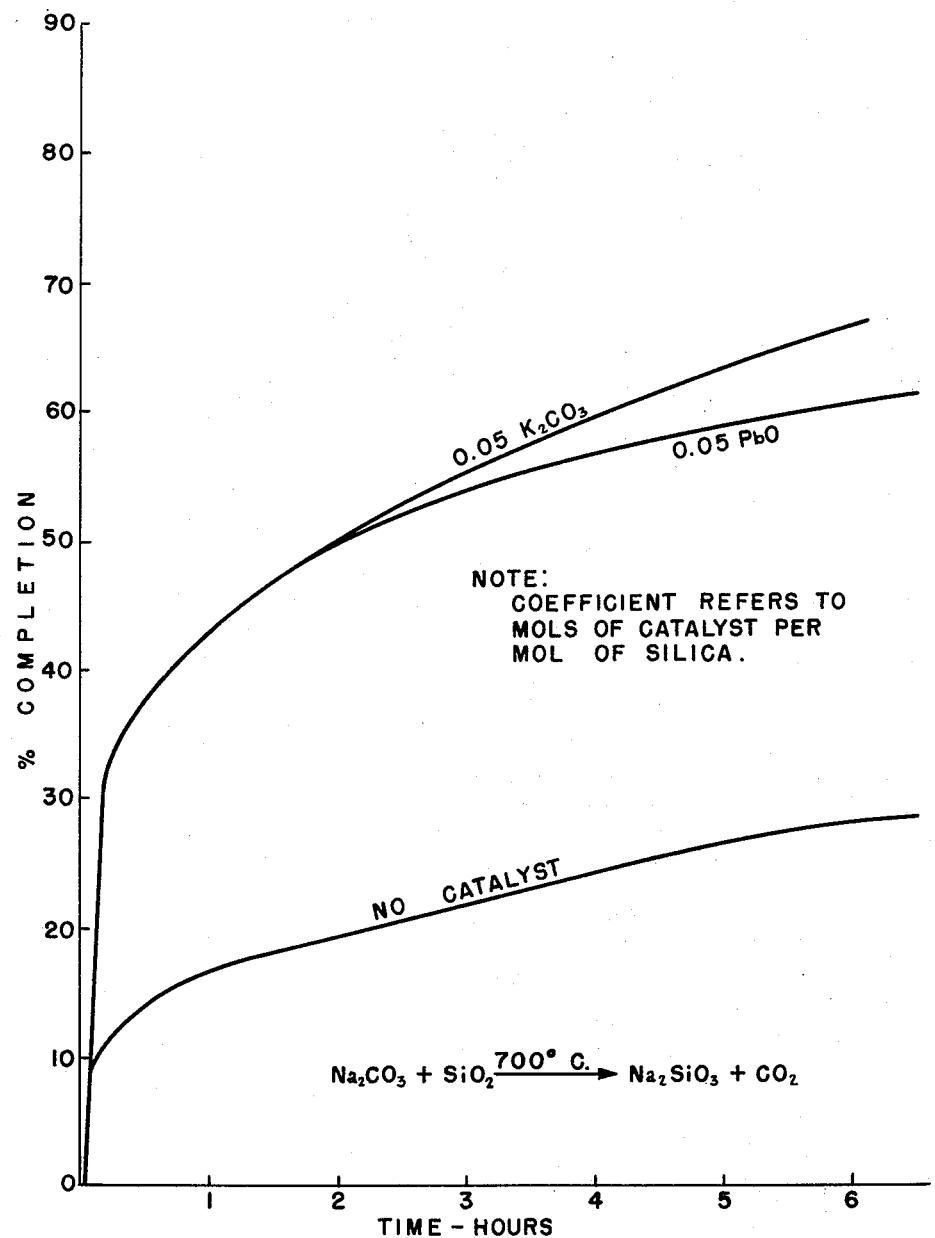

2,823,100
Patented Feb. 11, 1958

2,823,100

PRODUCTION OF SILICATES

Isadore Mockrin, Philadelphia, Pa., assignor to Pennsalt Chemicals Corporation, a corporation of Pennsylvania Application May 28, 1954, Serial No. 433,034

5 Claims. (Cl. 23—110)

The present invention relates to the manufacture of silicates and more particularly to improvements in the process of manufacturing silicates wherein the silicate is prepared by a substantially dry state reaction between an alkali metal carbonate and silica or other source of $SiO_2$.

It has heretofore been proposed to react an alkali metal carbonate, such as sodium carbonate, with silica in a substantially dry state to form sodium silicate. The process is particularly desirable from the standpoint of economy since sodium carbonate is substantially less expensive than sodium hydroxide as a source material for the $Na_2O$. The reactions have the objectionable feature, however, that temperatures in excess of 850° C. have been necessary in order to obtain a sufficiently rapid reaction to make the process commercially feasible.

At temperatures much in excess of 850° C. a melt occurs, particularly during the early stages of the reaction, which is corrosive and tends to attack the equipment in which the reaction is being carried out.

In order to avoid any substantial occurrence of melt while carrying out the reaction between the sodium carbonate and the silica, it has been proposed to first heat a mixture of the reactants to a temperature below 850° C. for a time sufficient to volatilize substantial amounts of $CO_2$ and thereafter raise the temperature (still maintaining it at a temperature below which any melt occurs) to increase the rate of reaction. In this manner the reaction can be carried out at sufficiently high temperatures to obtain a reasonable reaction rate while avoiding the occurrence of any substantial amount of melt. This process, however, has the inherent difficulty of requiring careful control in order to be sure that the temperature is not elevated too soon. Also, the high temperatures required add to the expense of obtaining the final product and are generally objectionable.

In my co-pending application Serial No. 433,031, filed of even date herewith, a process is described wherein substantially dry state reactions between alkali metal carbonates and silica are catalyzed by the inclusion of small amounts of inorganic halogen compounds. The present invention is drawn to the further discovery that these reactions are also catalyzed by the cations potassium and lead.

By the addition of small amounts of inorganic compounds containing these cations to the reaction mixture, the reaction can be substantially accelerated at temperatures well below that at which any melt occurs. The potassium and lead compounds have been found to act as catalysts even when present in quite small amounts. For example, amounts as low as 0.05 mol of potassium carbonate or lead oxide per mol of $SiO_2$ present have a substantial catalytic effect.

The surprising catalytic effect obtained by the addition of the cations potassium and lead is well illustrated by the accompanying drawing which contains curves showing the reaction rate at 700° C. for the reactants, sodium carbonate and silica in the presence of small amounts of these cations.

The curves, which are the results of actual experiments, are given for the purpose of illustration, and the invention is not limited to the specific potassium and lead salts shown. The potassium or lead may be present as halogens, sulfates, oxides, carbonates or borates.

In practicing the present invention, temperatures as low as 600° C. can be used. However, it is generally preferred to carry out the reaction between the alkali metal carbonate and the $SiO_2$ source material at a temperature within the range of 650° C. to just below the temperature at which any substantial melt occurs. This upper limit will in general be approximately 850° C. at atmospheric pressure during the early stages of the reaction for sodium carbonate. For the other alkali metal carbonates it will vary with their melting temperature. However, somewhat higher temperatures may be used if desired as long as no substantial amount of melt occurs, since the presence of the cations potassium and/or lead accelerate the reaction even at the higher temperatures. Some mixtures of silica and alkali metal silicates have somewhat lower melting temperatures than the alkali metal carbonates used. In such instances the temperature should be maintained below the melt temperature of the product.

It is generally preferred to use a finely-divided silica, the preferred particle size usually being minus 325 mesh. However, the process can be practiced successfully with silica in particle sizes as high as −65 +115 mesh. In such instances the temperature should be maintained below the melt temperature of the product.

The rate of the reaction can be varied markedly by varying the ratio of alkali metal carbonate to silicon dioxide. In practicing the present invention, the reactants are generally present in a silica to alkali metal carbonate mol ratio of 1:2 to 3:1. Where there is no objection to having some unreacted silica in the final product, the preferred mol ratio of silica to alkali metal carbonate in the reaction mixture is about 1.5:1 to 3:1.

The rate of reaction can be increased still further by substituting an alkali metal hydroxide for an equivalent part of the alkali metal carbonate. A surprising result obtained by substituting an alkali metal hydroxide for part of the alkali metal carbonate is that the resulting products give clearer solutions, when dissolved in water, than those prepared from reactants containing no alkali metal hydroxides.

Where the alkali metal carbonate is replaced in part by the alkali metal hydroxide, the alkali metal hydroxide is preferably used in amounts of 0.1 to 0.7 mol alkali metal hydroxide per mol alkali metal carbonate.

It is generally preferred to take advantage of the catalytic effect of the halogen compounds and the sulfate and tetraborate anions as described in my co-pending applications Serial Nos. 433,031, 433,032, and 433,033, filed of even date herewith. The cations potassium and lead are therefore preferably used in the form of compounds where they are in combination with these other catalysts.

In order to better illustrate the practice of the present invention, the following examples are given:

Example 1

The sodium silicate was prepared by grinding together 6.12 parts by weight sodium carbonate, 3.48 parts by weight of minus 325 mesh silica and 0.40 part by weight potassium carbonate. The resulting mixture had the formulation:

$$0.05\ K_2CO_3 + Na_2CO_3 + SiO_2$$

The ground mixture was heated for 6½ hours at a temperature of about 700° C., after which time the reaction was found to be 67% complete.

*Example 2*

The sodium silicate was prepared in a manner similar to that of Example 1 except that lead oxide was used in place of the potassium carbonate. The reactants were ground and heated as described in Example 1. The reaction mixture consisted of 6.01 parts by weight sodium carbonate, 3.41 parts by weight of minus 325 mesh silica and 0.58 part by weight lead oxide. The reaction mixture had the formulation:

$$0.05\ PbO + Na_2CO_3 + SiO_2$$

The reaction was found to be about 61% complete after heating the above mixture for 6½ hours at a temperature of 700° C.

As previously stated, the cations potassium and lead can be used in any form as catalysts and any of the alkali metal carbonates may be employed together with a suitable source of $SiO_2$. The conditions of the reaction would be substantially the same as those of the above given examples.

Having thus described my invention, I claim:

1. In the preparation of alkali metal silicates, the process comprising heating, in a substantially dry state, a mixture containing an alkali metal carbonate, silicon dioxide and an inorganic compound the cation of which is lead, said heating being at a temperature of from 600° C. to a temperature just below that at which any appreciable melt occurs.

2. In the preparation of alkali metal silicates, the process comprising heating, in a substantially dry state, to a temperature of from 600° C. to just below that at which any appreciable melt occurs, a mixture consisting essentially of an alkali metal carbonate, an alkali metal hydroxide, silicon dioxide and a small amount of an inorganic compound the cation of which is lead, in which mixture the mol ratio of silicon dioxide to the sum of the alkali metal oxide content of the alkali metal carbonate and alkali metal hydroxide is from 1:2 to 3:1 and in which said alkali metal hydroxide is present in amounts of from 0.1 to 0.7 mol alkali metal hydroxide per mol of alkali metal carbonate.

3. The process of making sodium metasilicate comprising reacting sodium carbonate with silicon dioxide in the presence of an inorganic compound the cation of which is a metal of the group consisting of potassium and lead, at a temperature within the range of 600° C. to a temperature just below that at which any appreciable melt occurs.

4. The process of claim 3 wherein the metal of said group is potassium.

5. The process of claim 3 wherein the metal of said group is lead.

References Cited in the file of this patent

UNITED STATES PATENTS

| | | |
|---|---|---|
| Re. 21,703 | Burkhart | Feb. 4, 1941 |
| 2,219,646 | Beecher | Oct. 29, 1940 |
| 2,239,880 | Curll | Apr. 29, 1941 |
| 2,357,723 | Beecher et al. | Sept. 5, 1944 |
| 2,374,035 | Nutting | Apr. 17, 1945 |

OTHER REFERENCES

Howarth et al.: "J. of Soc. of Glass Technology," vol. 17, Transactions, 1933, pages 25–49.